(12) United States Patent
Barker et al.

(10) Patent No.: US 11,375,833 B2
(45) Date of Patent: Jul. 5, 2022

(54) CONTAINER ASSEMBLY WITH ELECTRONIC TRANSACTION COMPONENT

(71) Applicant: Capital One Services, LLC, McLean, VA (US)

(72) Inventors: Calvin Barker, Washington, DC (US); Andrew Anderson, Washington, DC (US); William Nuckols, Seattle, WA (US)

(73) Assignee: Capital One Services, LLC, McLean, VA (US)

( * ) Notice: Subject to any disclaimer, the term of this patent is extended or adjusted under 35 U.S.C. 154(b) by 253 days.

(21) Appl. No.: 16/856,877

(22) Filed: Apr. 23, 2020

(65) Prior Publication Data

US 2021/0330105 A1    Oct. 28, 2021

(51) Int. Cl.
| | |
|---|---|
| *A47G 19/22* | (2006.01) |
| *G06Q 20/34* | (2012.01) |
| *B65D 23/00* | (2006.01) |
| *G06Q 20/10* | (2012.01) |
| *G06K 19/06* | (2006.01) |
| *G06Q 20/40* | (2012.01) |
| *G06K 19/00* | (2006.01) |
| *G06K 19/04* | (2006.01) |
| *G06Q 20/32* | (2012.01) |

(52) U.S. Cl.
CPC ....... *A47G 19/2255* (2013.01); *B65D 23/001* (2013.01); *G06Q 20/341* (2013.01); *G06K 19/00* (2013.01); *G06K 19/04* (2013.01); *G06K 19/06* (2013.01); *G06Q 20/102* (2013.01); *G06Q 20/3278* (2013.01); *G06Q 20/352* (2013.01); *G06Q 20/40* (2013.01)

(58) Field of Classification Search
CPC ............ A47G 19/2255; A47G 19/2227; A47G 23/16; B65D 23/001; B65D 2203/10; B65D 25/205; G06Q 20/341; G06Q 20/102; G06Q 20/3278; G06Q 20/352; G06Q 20/40; G06Q 20/405; G06K 19/00; G06K 19/04; G06K 19/06
See application file for complete search history.

(56) References Cited

U.S. PATENT DOCUMENTS 5,862,222 A      1/1999 Gunnarsson
5,990,790 A *  11/1999 Lusareta ............. F21V 33/0052
                                                                    362/101

(Continued)

OTHER PUBLICATIONS

Disney World Refillable Mug & Rapid Fill FAQ—Disney Tourist Blog; Tom Bricker, https://www.disneytouristblog.com/refillable-mugs-disney-world/; 21 pages, May 28, 2019.

(Continued)

*Primary Examiner* — Sonji N Johnson
(74) *Attorney, Agent, or Firm* — Banner & Witcoff, Ltd.

(57) ABSTRACT

A container assembly includes a container, e.g., configured for containing a beverage, where the container has a connecting structure, and a carrier assembly that includes a carrier having an engagement structure configured for releasable connection to the connecting structure of the beverage container to releasably connect the beverage container to the carrier assembly. The carrier assembly also includes a chip engaged with the carrier such that the chip is carried by the carrier, where the chip stores electronic payment information and is configured for transmitting the electronic payment information to an external computer for authorizing payment.

20 Claims, 11 Drawing Sheets

(56) References Cited

U.S. PATENT DOCUMENTS

| | | |
|---|---|---|
| 7,439,859 B2 | 10/2008 | Humphrey |
| 7,617,850 B1 | 11/2009 | Dorney |
| 7,845,375 B2 | 12/2010 | Dorney |
| 8,130,083 B2 | 3/2012 | Dorney |
| 8,151,832 B1 | 4/2012 | Dorney |
| 8,245,739 B1 | 8/2012 | Wade et al. |
| 8,561,830 B2 | 10/2013 | Hallberg |
| 8,768,505 B2 | 7/2014 | Thompson |
| 9,334,150 B1 | 5/2016 | Ost et al. |
| 9,471,915 B2 * | 10/2016 | Fuerstenberg ....... G06Q 20/341 |
| 9,679,329 B2 | 6/2017 | Jones |
| 2005/0087255 A1 | 4/2005 | Humphrey et al. |
| 2006/0277817 A1 * | 12/2006 | Rousso .............. A47G 19/2227 43/44.2 |
| 2007/0068208 A1 * | 3/2007 | Norman ............. G08B 13/2434 70/357 |
| 2009/0001177 A1 | 1/2009 | Smith et al. |
| 2010/0187298 A1 | 7/2010 | Phillips et al. |
| 2013/0270142 A1 * | 10/2013 | Yao .................... A47G 19/2227 206/459.1 |
| 2015/0227828 A1 * | 8/2015 | Niblett ............. G06K 19/07758 235/492 |

OTHER PUBLICATIONS

FAQ—ValidFill; www.validfill.com/faq; 5 pages; downloaded May 28, 2019.

* cited by examiner

CONTAINER ASSEMBLY WITH ELECTRONIC TRANSACTION COMPONENT

FIELD

This disclosure relates to container assemblies with electronic payment capabilities, and more specifically to a container for holding a beverage or other fluid that includes a component, such as a chip, configured for use in electronic payment or other transaction.

BACKGROUND

Beverage containers and other containers with components such as RFID chips and electronic payment cards that are configured for use in electronic transactions exist. For example, some such containers include an electronic component that is connected to the container by adhesive, molded into the body of the container, or received in a cavity within the container, among other structures. However, these existing containers do not provide convenient structures for interchanging different electronic payment components. Additionally, these existing containers are often limited in their use and versatility. The present disclosure is provided to address this need and other needs in existing electronically-enabled containers. A full discussion of the features and advantages of the present invention is deferred to the following detailed description, which proceeds with reference to the accompanying drawings.

BRIEF SUMMARY

Aspects of the disclosure relate to an assembly that includes a carrier having a base configured to rest on a horizontal supporting surface, a receptacle connected to the base, and an engagement structure configured for releasable connection to a beverage container, and a chip engaged with the receptacle such that the chip is carried by the carrier, the chip storing electronic payment information, where the chip is configured for transmitting the electronic payment information to an external computer for authorizing payment. The engagement structure includes an engagement member connected to the base and releasably connected to the beverage container to connect the beverage container to the base, such that the base is configured to support the beverage container on the supporting surface. The chip may be removably or non-removably engaged with the receptacle in various configurations.

According to one aspect, the chip may include at least one of a radio-frequency identification tag or a near-field communication chip.

According to another aspect, the engagement member may be configured for releasably engaging a complementary engagement member on the beverage container to connect the carrier to the beverage container. In one configuration, the engagement member may be a threaded member configured to engage the complementary engagement member on the beverage container by a threading connection. In another configuration, the engagement member may be a tab configured to engage the complementary engagement member. In a further configuration, the engagement member may be a slot configured to receive the complementary engagement member. In yet another configuration, the engagement member may be configured to engage the complementary engagement member by rotation between a locked position, where the engagement member is configured to engage the complementary engagement member to connect the carrier to the beverage container, and an unlocked position, where the engagement member is configured to disengage from the complementary engagement member to permit removal of the carrier from the beverage container.

According to a further aspect, the carrier may include a cover that is moveable to open and close the receptacle, and the chip may be removable from and insertable into the receptacle when the cover is moved such that the receptacle is open.

According to yet another aspect, the chip may be removable and interchangeable with a second chip such that the second chip is carried by the carrier, the second chip storing second electronic payment information that is different from the electronic payment information, where the second chip is configured for transmitting the second electronic payment information to the external computer for authorizing payment.

According to a still further aspect, the base may be configured to support the beverage container on the supporting surface such that no portion of the beverage container contacts the supporting surface.

Additional aspects of the disclosure relate to a system that includes a beverage container configured for containing a beverage, the beverage container having a connecting structure, a first attachment, and a second attachment. The first attachment may include a first carrier having a first engagement structure configured for releasable connection to the connecting structure of the beverage container to releasably connect the beverage container to the first attachment, and a first chip engaged with the first carrier such that the first chip is carried by the first carrier. The second attachment may include a second carrier having a second engagement structure configured for releasable connection to the connecting structure of the beverage container to releasably connect the beverage container to the second attachment, and a second chip engaged with the second carrier such that the second chip is carried by the second carrier. The first chip may store first electronic payment information, and the second chip may store second electronic payment information, where the first chip is configured for transmitting the first electronic payment information to an external computer for authorizing payment, and the second chip is configured for transmitting the second electronic payment information to the external computer for authorizing payment. The first attachment and the second attachment may be interchangeable with each other for connection to the beverage container, and the first electronic payment information may be different from the second electronic payment information.

According to one aspect, the first payment information may include a first unique identifier associated with the first chip, and the second payment information may include a second unique identifier associated with the second chip.

According to one aspect, the first engagement structure and the second engagement structure may both be configured for releasable connection to the connecting structure of the beverage container by rotation with respect to the beverage container.

According to a further aspect, the first engagement structure and the second engagement structure may both be configured for releasable connection to the connecting structure of the beverage container by a flexible tab and an engagement surface engaged by the flexible tab, such that the connecting structure of the beverage container includes one of the flexible tab and the engagement surface, and the first and second engagement structures each comprise the other of the tab and the engagement surface.

According to yet another aspect, the first carrier and the second carrier may include visible indicia indicating a difference between the first payment information and the second payment information.

According to a still further aspect, the system may include a second beverage container having a different structure from the first beverage container, the second beverage container having second connecting structure, wherein the first engagement structure and the second engagement structure are configured for releasable connection to the second connecting structure of the second beverage container such that the first attachment and the second attachment are interchangeable with each other for connection to the second beverage container.

Further aspects of the disclosure relate to a computer-implemented method for use with a computer system that includes at least one computing device. The method may include storing at the computer system, a first unique identifier identifying a first chip associated with a first payment authorization parameter and a second unique identifier identifying a second chip associated with a second payment authorization parameter that is different from the first payment authorization parameter, where the first chip and the second chip are configured for engaging a beverage container to physically connect the first or second chip to the beverage container, such that the first chip and the second chip are interchangeably connectable to the beverage container. A first request for payment authorization associated with the first unique identifier may be received at the computer system, when the first chip is physically connected to the beverage container, and the computer system may authorize payment according to the first payment authorization parameter in response to the first request. A second request for payment authorization associated with the second unique identifier may be received at the computer system, when the second chip is physically connected to the beverage container, and the computer system authorizes payment according to the second payment authorization parameter in response to the second request. The method may be used in connection with a container assembly or system as described herein.

According to one aspect, the second payment authorization parameter may be different from the first payment authorization parameter by at least one of authorizing payment from different accounts and authorizing payment to different merchants.

According to another aspect, the first request for payment authorization may be received from a first merchant authorized for payment according to the first authorization parameter and not authorized for payment according to the second authorization parameter, and the second request for payment authorization may be received from a second merchant authorized for payment according to the second authorization parameter and not authorized for payment according to the first authorization parameter.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
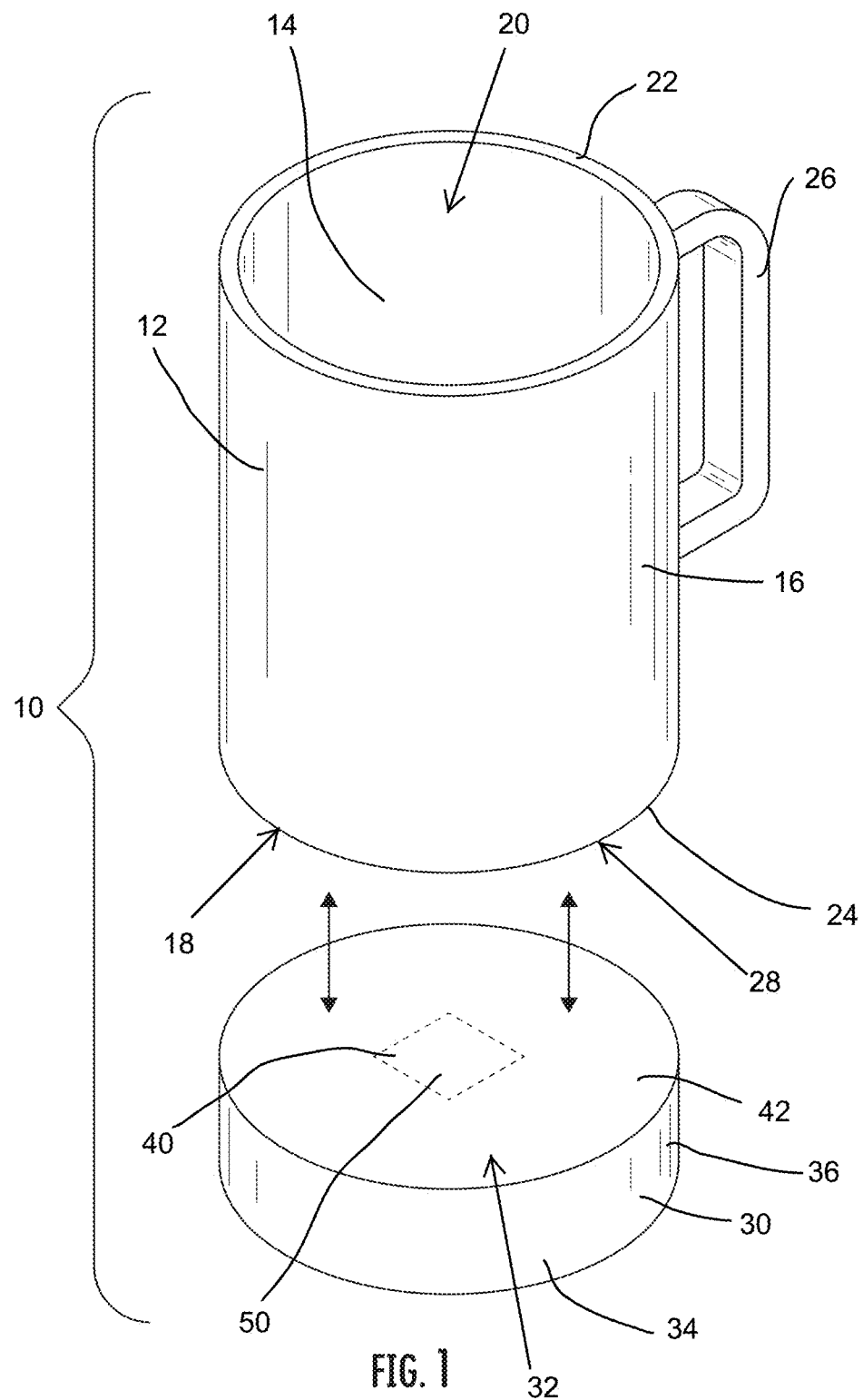
FIG. 1 is a schematic perspective view of one embodiment of a container assembly according to aspects of the present disclosure including a container and a removable carrier assembly shown separated from the container.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Referring first to FIG. 1, there is shown a container assembly 10 that includes a container 12 and a carrier assembly or attachment 30 connected to the container 12 that includes a carrier 34 connected to the container 12 and a chip 50 that is engaged and carried by the carrier 34. The carrier attachment 13 in FIG. 1 is configured to be removably connected to the container 12 as described in greater detail herein. The container 12 illustrated in FIG. 1 is configured for use as a beverage container, as are the containers 12 illustrated in FIGS. 2-9, although containers configured for other end uses may be used in connection with the principles described herein. In general, the container 12 includes a cavity 14 surrounded by walls including a side wall (or walls) 16 and a bottom wall 18, such that the cavity 14 is configured to hold a fluid or other contents. It is understood that the side wall(s) 16 and/or the bottom wall 18 may be formed by single panels or walls, or may be made from a multi-wall structure, such as with an insulation gap between walls. The side wall 16 and the bottom wall 18 define the container 12 and the cavity 14 in a circular cylindrical shape in the embodiment of FIG. 1, but other container 12 and cavity 14 shapes may be used in other embodiments. An opening 20 is located at a top 22 of the container 12, and the bottom wall 18 is located at a bottom 24 of the container 12. In some configurations, the container 12 may have a removable or non-removable lid (not shown) that is configured to selectively open and close the opening 20 for dispensing of contents therethrough. The container 12 illustrated in FIG. 1 has a handle 26 configured for gripping, and in other embodiments, the container 12 may have additional or alternate grip-aiding structures, or may have no such structure. The container 12 in each embodiment shown in FIGS. 1-7 is configured to form its own base for resting on a surface, or to connect to a carrier assembly 30 that forms a base 36 upon which the container assembly 10 rests such that no portion of the container 12 touches the resting surface.

The carrier assembly 30 generally includes a carrier 34 configured for connection to the container 12 and having a receptacle 40 configured to receive the chip 50, such that the container assembly 10 includes the chip 50 to enable the container assembly 10 to be used in electronic transactions. The carrier 34 forms a base 36 upon which the entire container assembly 10 rests such that the entire container 12 is supported by the carrier assembly 30, in some embodiments, including the embodiments of FIGS. 1-9. The base 36 is connected to the receptacle 40, and in the embodiments described herein, the carrier 34 forms both the base 36 and the receptacle 40. The chip 50 is schematically illustrated as being received in a receptacle 40 in FIGS. 1-7, and it is understood that the chip 50 may be engaged with the carrier assembly 30 and positioned in any location described herein.

The chip 50 may be engaged with the carrier assembly 30 in a variety of different manners. The chip 50 in FIGS. 1-7 is schematically illustrated as being permanently or semi-permanently contained within the base 36, such as by molding the container body around the chip 50 to integrally form the receptacle 40 or sealing the chip between two permanently or semi-permanently connected portions of the base 36 to define the receptacle 40 between the portions. For example, the base 36 may be formed by two or more pieces that are connected together by welding, a bonding material, interlocking structures, and/or fasteners, where the receptacle 40 is positioned between two or more of such pieces, and the chip 50 is sandwiched between the pieces or otherwise engaged by the pieces to retain the chip 50 within the base 36. It is understood that the pieces in such an embodiment may have structure designed to accommodate the chip 50, such as by defining the receptacle 40 as an inner compartment or cavity between them. It is also understood that one such piece may include a cavity forming the receptacle 40 that receives the chip 50, with another piece closing the receptacle 40 to retain the chip 50. As another example, the chip 50 may be adhesively connected to the base 36, such as on one of the outer or inner surfaces thereof. In another embodiment, as shown in FIG. 8, the chip 50 may be removably received within a receptacle 40 within the base 36. The receptacle 40 in FIG. 8 is provided with a cover 38 in the form of a reclosable hinged door that can be opened to permit insertion, removal, or interchanging of the chip 50 and then closed to retain the chip 50 within the receptacle 40. The cover 38 may include a latching structure or other closure structure 46 configured to retain the cover 38 in the closed position. Examples of closure structures 46 include a flexible tab or tabs (a tab and slot arrangement is illustrated in FIG. 8), a sliding pin, a removable fastener, a quarter-turn lock, or other releasable closure structures or combinations of such structures. The carrier 34 may include a receptacle 40 designed to non-removably receive the chip 50 after external insertion in a further embodiment, such as including a locking tab that retains the chip 50 within the receptacle 40 after insertion.

Figure 2:
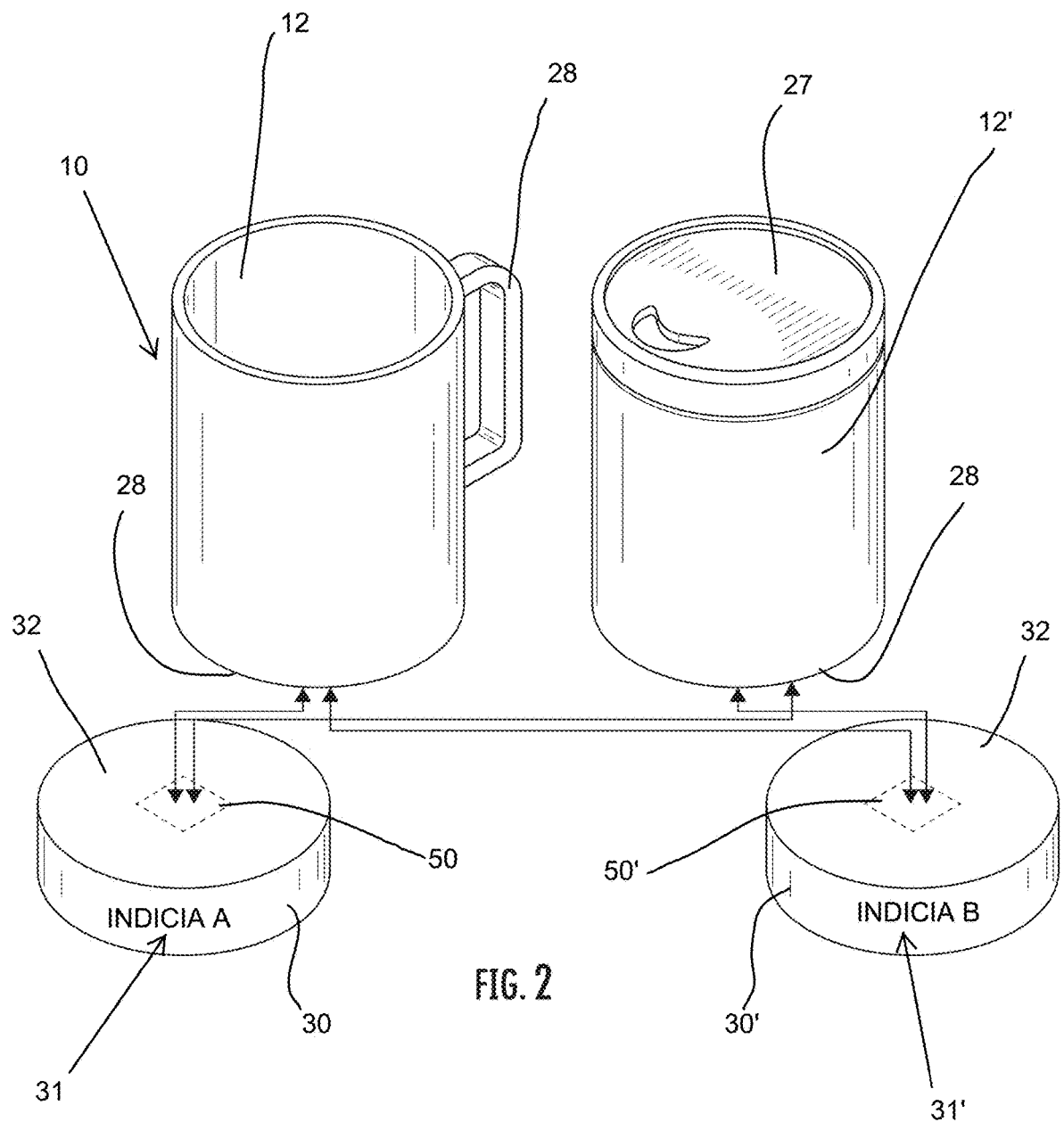
FIG. 2 is a schematic perspective view of the container of FIG. 1 and a second container, with two carrier assemblies that are removable and interchangeable with either of the containers.

The carrier assembly 30 is removably connected to the container 12 by a removable or releasable connecting structure 28 and/or 32 located on the container 12 and/or the carrier 34. It is noted that the connecting structure 28, 32 described herein may alternately be referred to herein as "engagement structure" 28, 32. In one embodiment, the container 12 and the carrier assembly 30 have complementary connecting structures 28, 32 that have complementary structures designed for releasably engaging each other. FIGS. 1-2 do not illustrate specific connecting structures, and it is understood that this embodiment can use any connecting structure described herein. Various different types of releasable connecting structures may be used.

Figure 3:
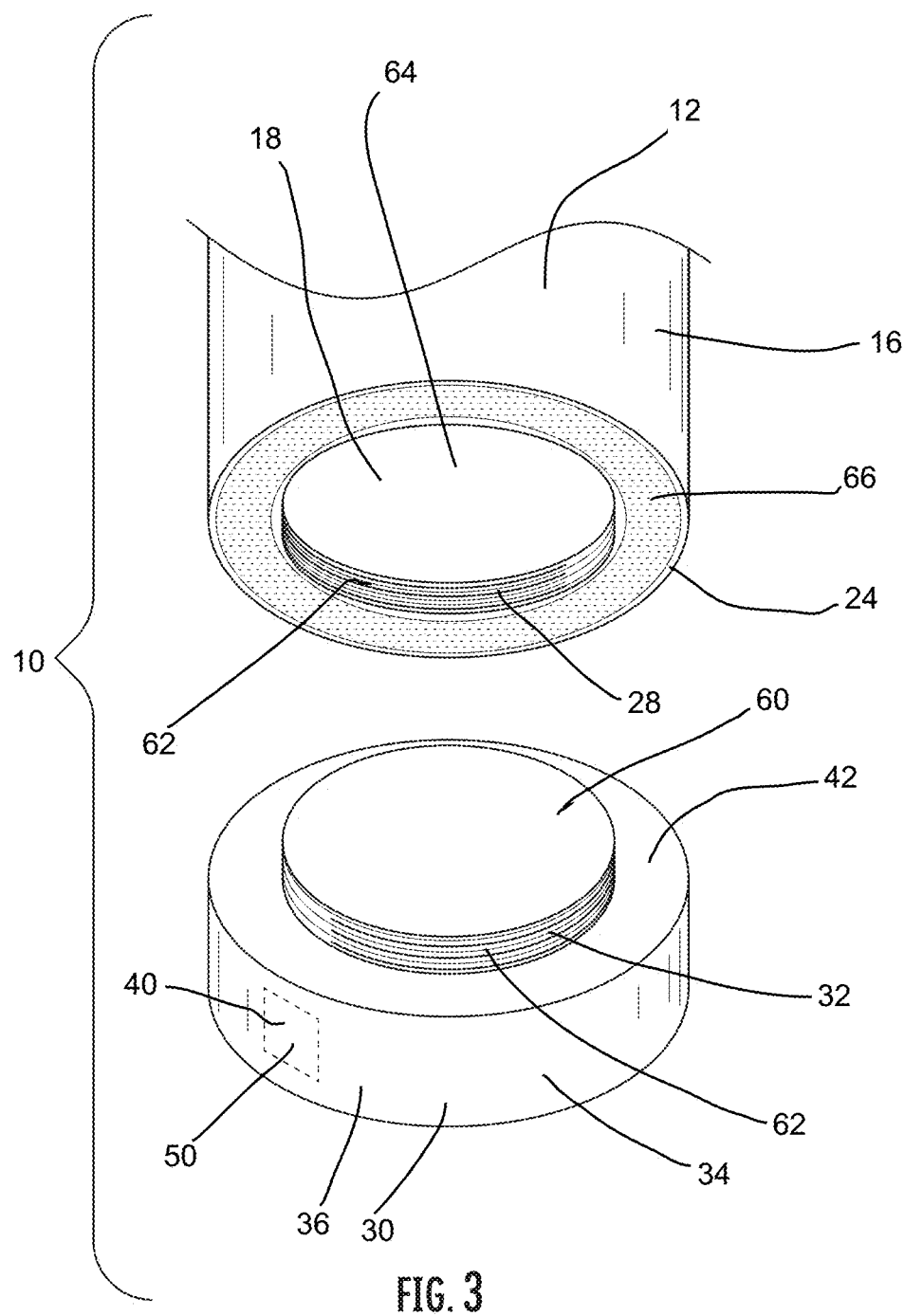
FIG. 3 is a perspective view of another embodiment of a container assembly according to aspects of the present disclosure, including a container and a removable carrier assembly shown separated from the container.

For example, FIG. 3 illustrates an embodiment where the container 12 and the carrier assembly 30 have connecting structures 28, 32 in the form of complementary threaded members or structures for engagement. In this embodiment, the connecting structure 32 of the carrier assembly 30 includes a cylindrical projection 60 that extends upward from the top surface 42 of the base 36, with threading 62 on the outer surface of the projection 60. The connecting structure 28 of the container 12 in this embodiment includes a cylindrical recess 64 that receives the projection 60 and extends upward from the underside of the container 12. The recess 64 has threading 62 that is complementary to the threading 62 of the projection 60, such that the container 12 is connected to the carrier assembly 30 by threaded connection between the projection 60 into the recess 64. The connecting structures 28, 32 may be considered to permit rotation between a locked position, where the complementary connecting structures 28, 32 engage each other to retain the carrier assembly 30 in connection with the container 12, and an unlocked position, where the complementary connecting structures 28, 32 disengage from each other to permit removal of the carrier assembly 30 from the container 12. In another embodiment, the positions of the projection 60 and the recess 64 may be transposed, with the projection 60 on the container 12 and the recess 64 on the carrier 34, such as the projection 72 and the recess 74 in FIGS. 4-5. The projection 60 is narrower than the top surface 42 of the base 36 in FIG. 3, but in another embodiment, the projection 60 may have the same width as, or a greater width than, the base 36.

The container 12 in FIG. 3 further includes a spacer or gasket 66 that is made from a resilient material (e.g., rubber, foam, etc.) and sandwiched between the container 12 and the carrier 34. The spacer 66 in FIG. 3 is a ring on the underside of the container 12 that surrounds the projection 60 and closes any gap that may exist between the container 12 and the carrier 34. In other embodiments, the spacer 66 may additionally or alternately be positioned on the bottom of the projection 60, or may be positioned on the top side of the carrier 34, such as surrounding the recess 64 and/or within the recess 64. Other embodiments described herein may include a spacer 66 that functions similarly to the spacer 66 of FIG. 3, and it is understood that the spacers 66 in such other embodiments may be structured and positioned based on the structures of the container 12 and the carrier 34 in that particular embodiment.

Figure 4:
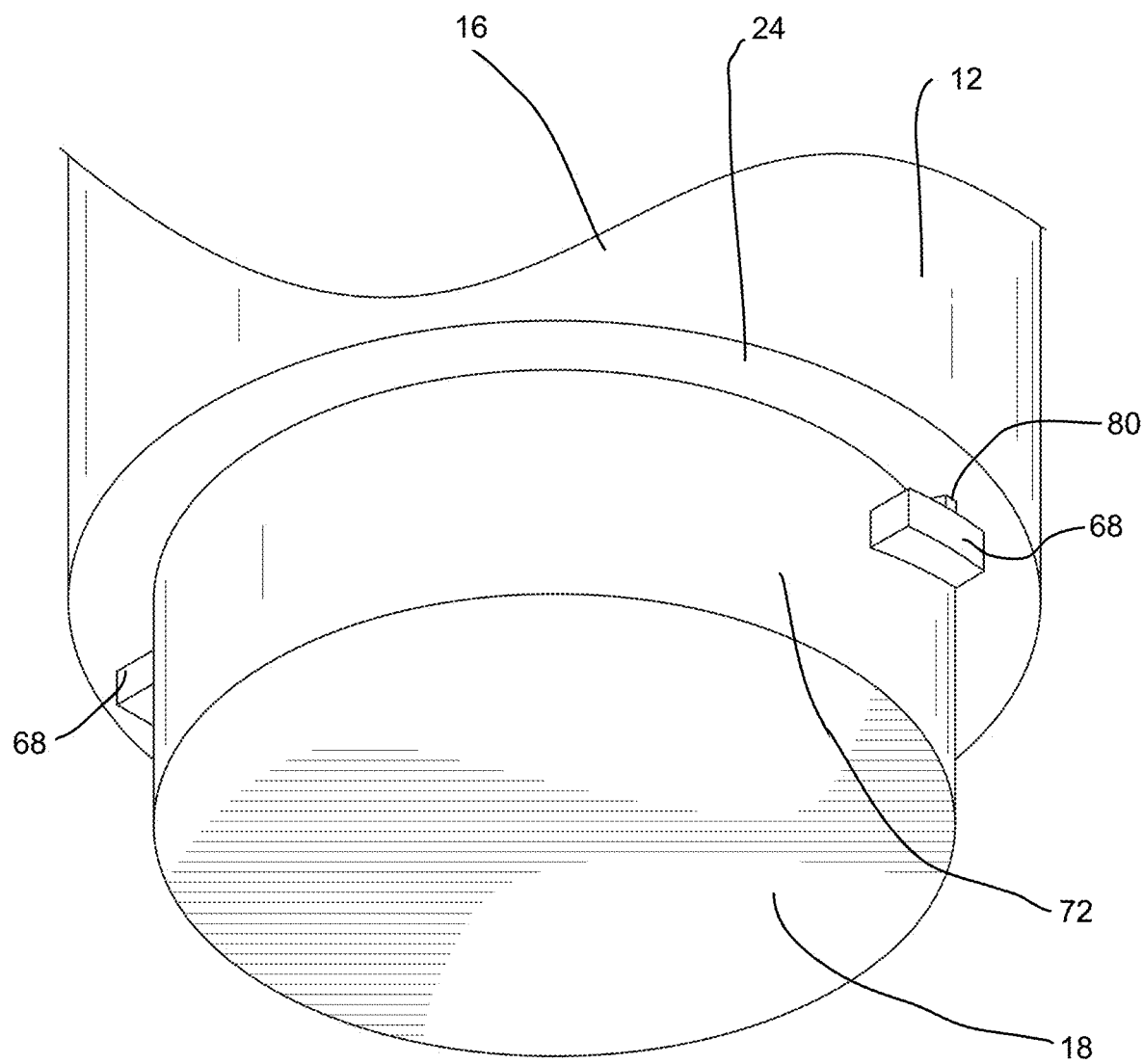
FIG. 4 is a perspective view of another embodiment of a container configured for use as part of a container assembly according to aspects of the present disclosure.
Figure 5:
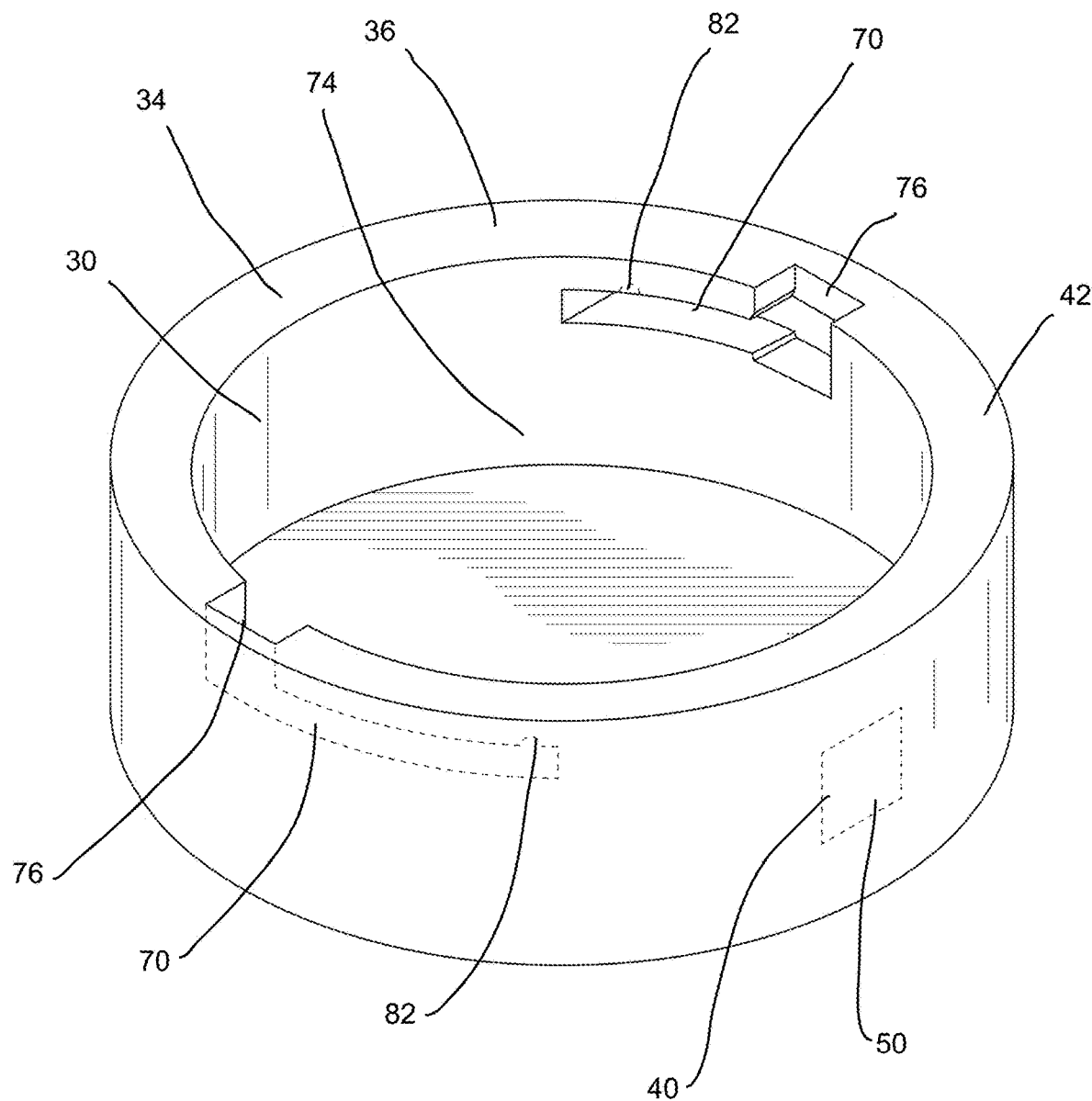
FIG. 5 is a perspective view of another embodiment of a removable carrier assembly configured for use with the container of FIG. 4 as part of a container assembly according to aspects of the present disclosure.

As another example, FIGS. 4 and 5 illustrate an embodiment where the container 12 and the carrier assembly 30 have connecting structures 28, 32 in the form of complementary rotational locking structures for engagement. The locking structures include one or more tabs 68 connected to the container 12 and extending outward from the container 12 and one or more slots 70 on the carrier 34 that are configured to receive the one or more tabs 68. The container 12 in FIG. 4 has two tabs 68 extending outwardly from opposite sides of a cylindrical projection 72 that is narrowed with respect to the adjacent portions of the container sidewall 16 and extends downward from the underside of the container 12. The cavity 14 may extend into the projection 72 in one embodiment to provide additional volume for the cavity 14. The carrier 34 in FIG. 5 has a recess 74 extending downward from the top surface 42 and into the base 36, and the slots 70 are elongated extend generally circumferentially around the inner walls of the recess 74 and upward to form openings 76 at the top surface 42 of the base 36. The container 12 is connected to the carrier assembly 30 by inserting the projection 72 into the recess 74 such that the tabs 68 pass into the openings 76 of the slots 70, and then rotating the container 12 relative to the base 36 to cause the tabs 68 to travel within the slots 70. In the embodiment of FIGS. 4-5, the range of travel of the tabs 68 within the slots 70 is approximately 90° relative rotation of the container 12 and the carrier assembly 30. Additionally, the slots 70 in FIG. 5 have beveled or chamfered surfaces 78 to guide the tabs 68 into the circumferential portions of the slots 70. Further, the tabs 68 in FIG. 4 each have a protrusion 80, and the slots 70 each have a notch 82, such that the protrusions 80 engage the notches 82 to form a retaining structure to retain the tabs 68 in the locked position and provide resistance against the tabs 68 being rotated back toward the unlocked position. It is understood that the slots 70 may have some degree of downward angle in order to bring the container 12 and the carrier assembly 30 closer together during rotation. In other embodiments, the positions of the projection 72 and the recess 74 may be transposed, as similarly described above with respect to FIG. 3, and/or the positions of the tabs 68 and the slots 70 may be transposed, such that the tabs 68 may extend inward from the inner surfaces of the recess 74 and the slots 70 may be formed in the outer surface of the projection 72.

Figure 6:
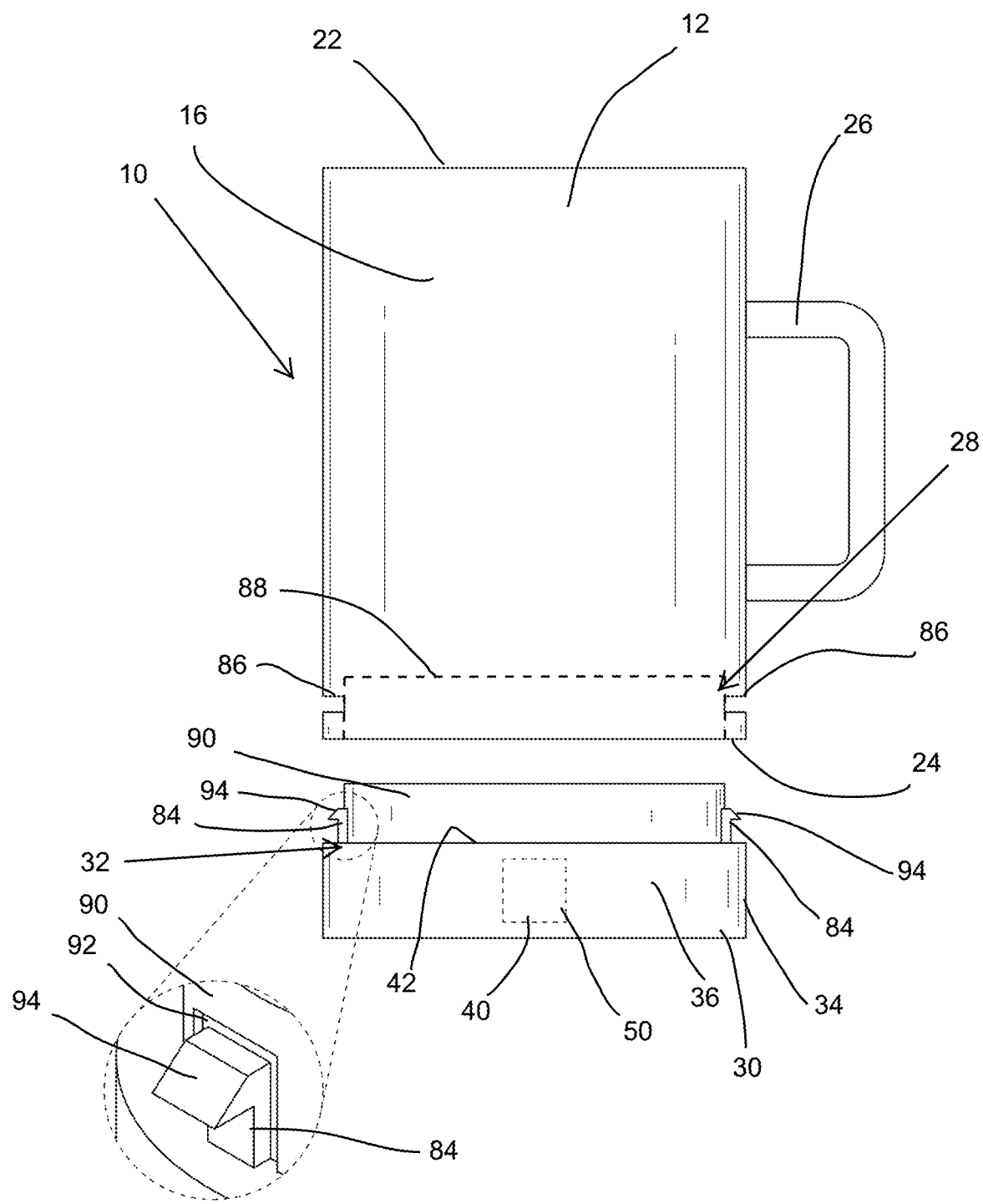
FIG. 6 is a side view of another embodiment of a container assembly according to aspects of the present disclosure, including a container and a removable carrier assembly shown separated from the container, with a magnified portion of the carrier shown in perspective.

As a further example, FIG. 6 illustrates an embodiment where the container 12 and the carrier assembly 30 have connecting structures 28, 32 in the form of complementary flexible retaining tabs and slots for engagement. The connecting structures 28, 32 include one or more tabs 84 connected to the carrier 34 and one or more slots 86 on the container that are configured to engage the one or more tabs 84. The container 12 in FIG. 6 has a recess 88 on the bottom 24, with two slots 86 positioned on opposite sides of the recess 88, such that the slots 86 are exposed within the recess 88. The slots 86 in FIG. 6 extend outward from the recess 88 through the container sidewall 16. The carrier 34 in FIG. 6 has a projection 90 that extends upward from the top surface 42 of the base 36, with the tabs 84 positioned on opposite sides of the projection 90. The projection 90 is received in the recess 88 when the carrier assembly 30 is connected to the container 12, and the tabs 84 are received within the slots 86 to releasably engage the carrier assembly 30 with the container 12. The tabs 84 are resilient and can flex rearwardly and outwardly as necessary for engagement. The projection 90 has windows or cavities 92 behind the tabs 84 to permit the tabs 84 to flex rearward, and the tabs 84 are provided with ramped surfaces 94 to flex the tabs 84 rearwardly on insertion. In another embodiment, the carrier assembly 30 may not have a projection 90 and/or may have tabs 84 with a different number, orientation, and/or structure. In further embodiments, the positions of the tabs 84 and the slots 86 and/or the positions of the projection 90 and the recess 88 may be transposed between the container 12 and the carrier assembly 30, as similarly described above with respect to FIG. 3. The orientations of the tabs 84 and the slots 86 may also be transposed in such embodiments, such that the tabs 84 extend inwardly from the outer edges of the recess 88 and engage slots 86 on the outer surface of the projection 90. Accordingly, the connection structures 28, 32 may include one or more flexible tabs 84 and one or more engagement surfaces 86 engaged by the flexible tab(s) 84, such that the connecting structure 28 of the container 12 includes the flexible tab(s) 84 or the engagement surface(s) 86, and the connecting structure 32 of the carrier 34 includes the other of the tab(s) 84 and the engagement surface(s) 86.

Figure 7:
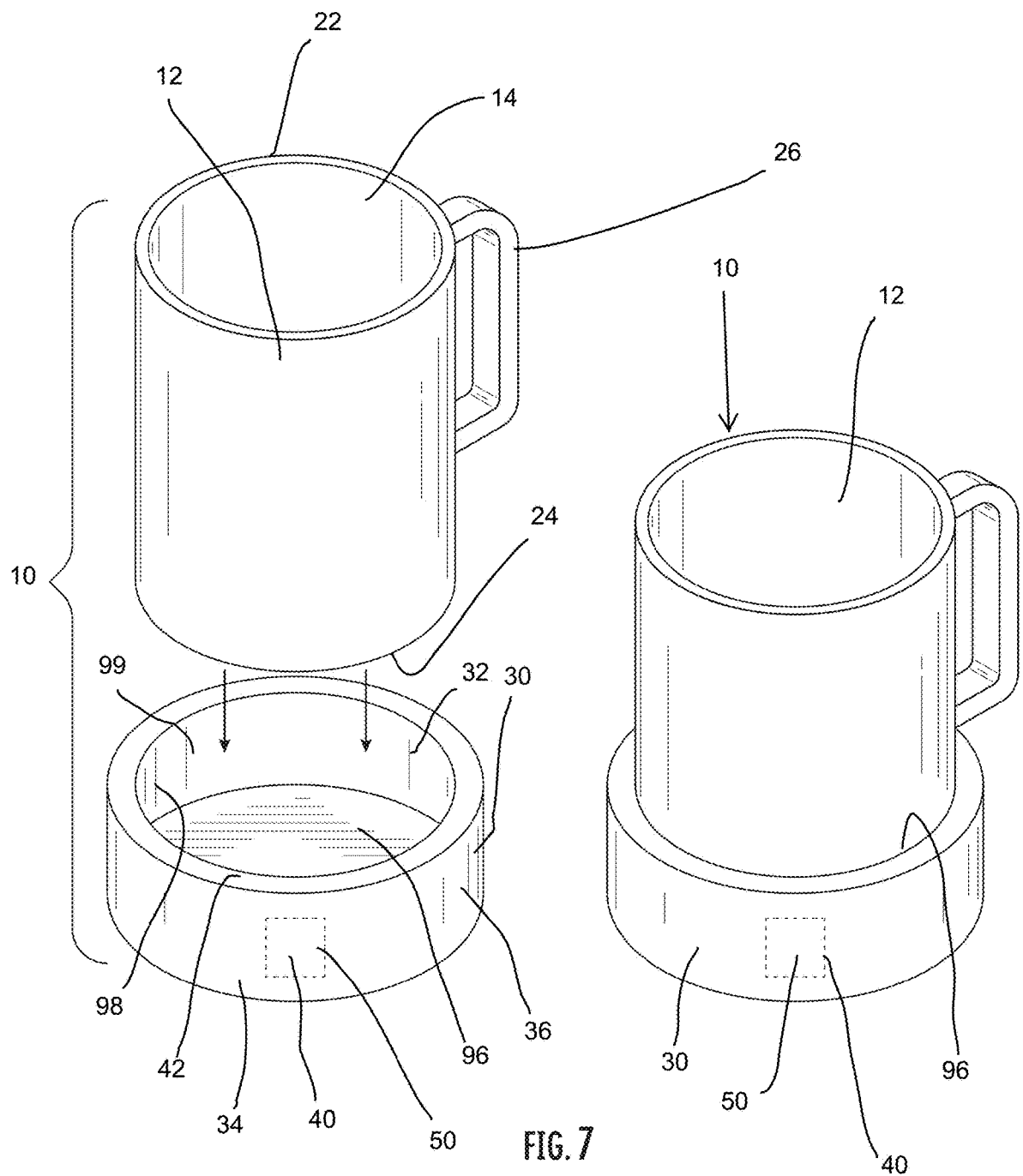
FIG. 7 is a perspective view of another embodiment of a container assembly according to aspects of the present disclosure, including a container and a removable carrier assembly shown separated from the container and connected to the container, with arrows depicting relative motion between the container and the carrier assembly.
Figure 8:
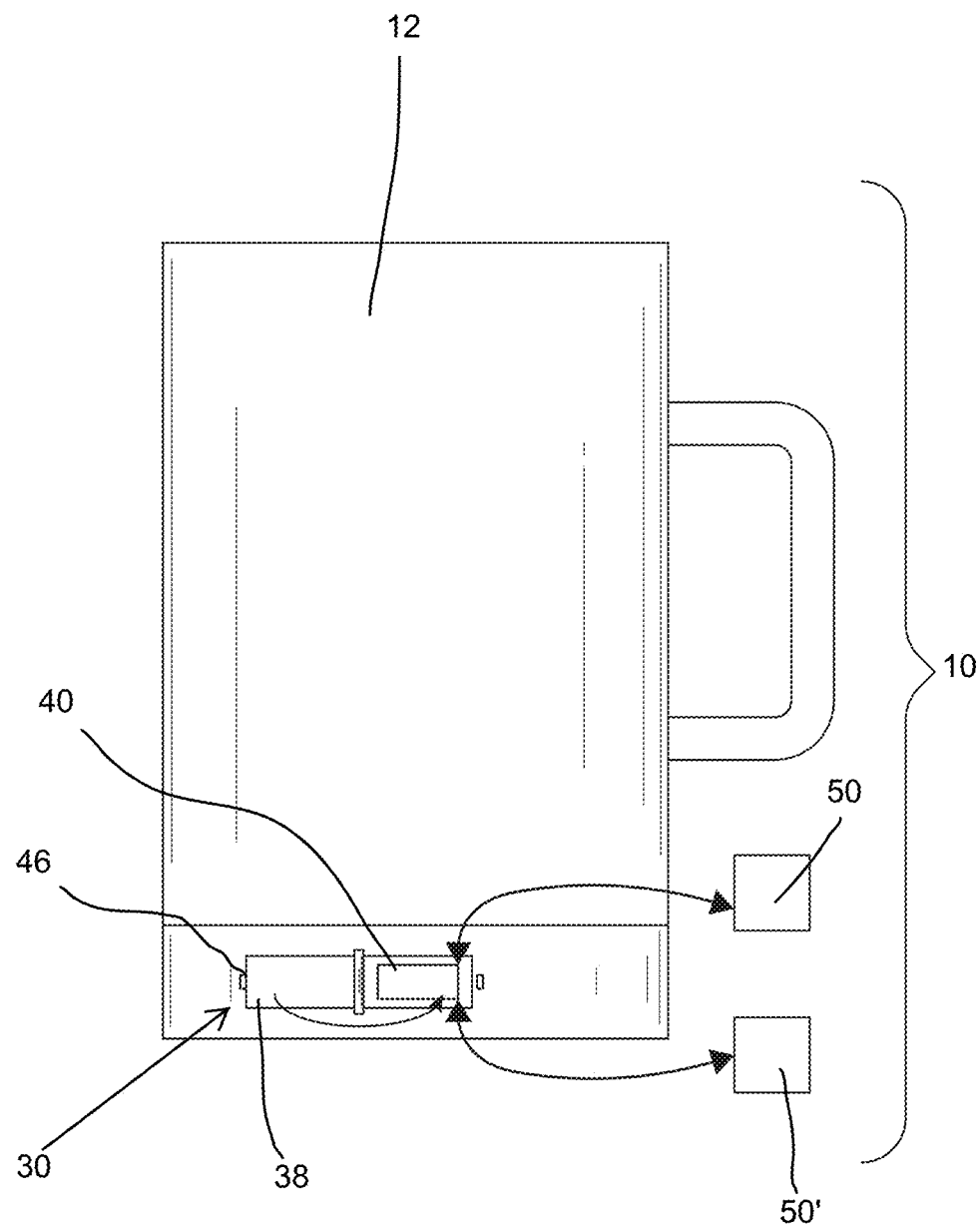
FIG. 8 is a perspective view of another embodiment of a container assembly according to aspects of the present disclosure, including a container and a carrier assembly having a reclosable door configured to interchangeably receive multiple chips, with arrows depicting interchangeability of the chips and closing of the reclosable door.

As a further example, FIG. 7 illustrates an embodiment where the container 12 and/or the carrier assembly 30 have connecting structures 28, 32 in the form of one or more grip-enhancing surfaces. As shown FIG. 7, the carrier 34 has a recess 96 in the base 36 that is configured to receive a portion of the container 12 (at least the bottom 24 of the container 12), and the inner surfaces of the recess 96 and/or the outer surfaces of the container 12 have a grip-enhancing structure 98 to create sufficient resistance to slippage that the base 36 does not slip from the container 12 during normal usage. In the embodiment of FIG. 7, the inner peripheral surface 99 of the recess 96 has grip enhancing structure 98 that is configured to provide increased slippage resistance against the surface of the container sidewall 16. For example, the grip enhancing structure 98 may be a water-resistant, tacky or adhesive material applied to the inner peripheral surface 99 or a high friction (e.g., rubber) material connected to the inner peripheral surface 99. The grip enhancement provided by the grip enhancing structure 98 should be sufficient to resist slippage in normal usage, but permit removal of the carrier assembly 30 from the container 12 if excess force is exerted. In other embodiments, the outer surface of the sidewall 16 may additionally or alternately have a grip enhancing structure 98. It is understood that in other embodiments, the carrier base 36 may be taller, and the recess 96 may be deeper, in order to increase coverage of the container 12 by the carrier 34. It is also understood that the inner peripheral surface 99 of the recess 98 may be dimensioned and contoured to match the dimensions and contours of the outer surface of the sidewall 16. For example, in FIG. 7, both the inner surface 99 of the recess 98 and the container sidewall 16 are circular cylindrical structures, but in other embodiments, non-circular and/or tapered structures may be used.

Figure 9:
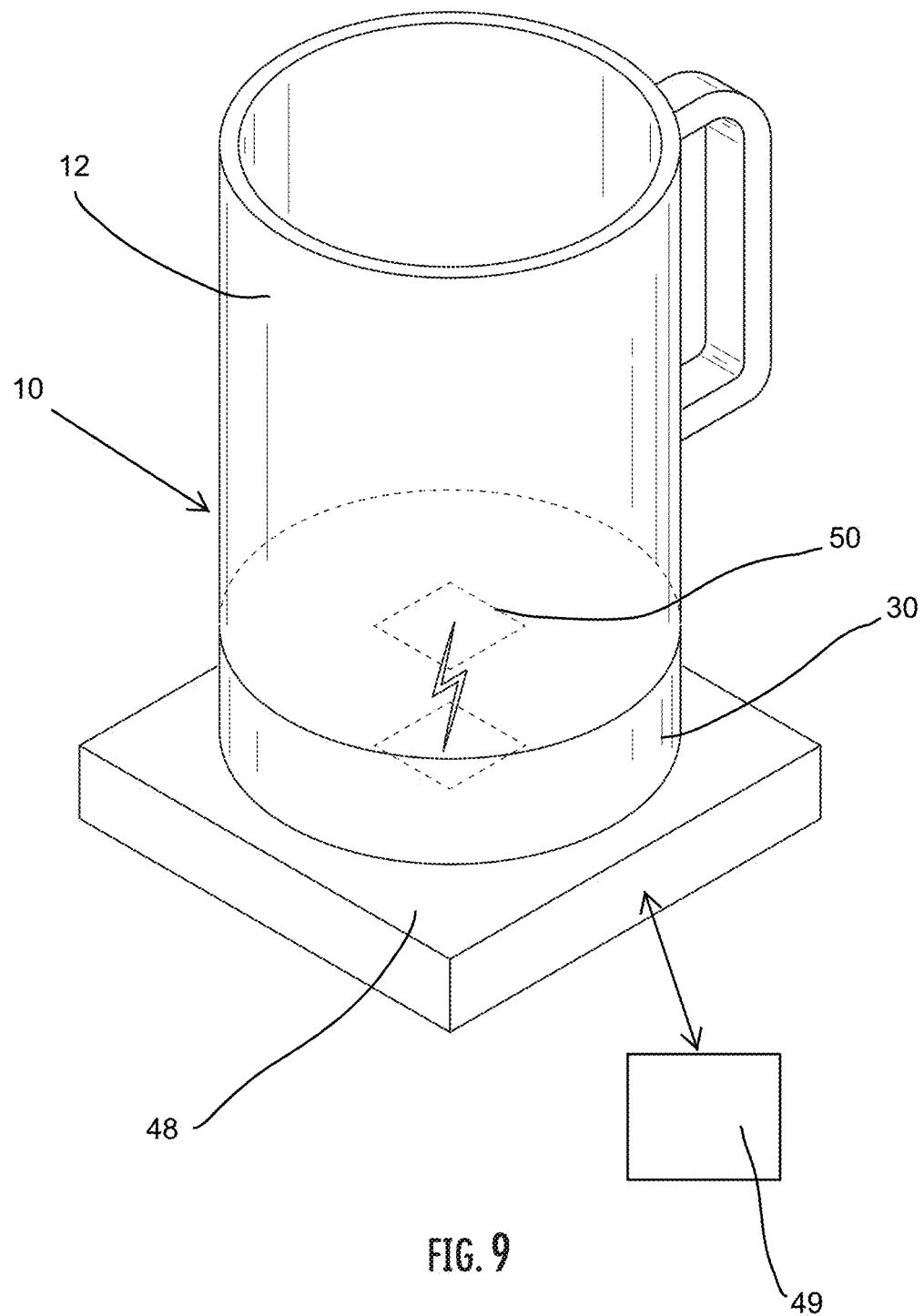
FIG. 9 is a perspective view of the container assembly of FIG. 1 in use with a wireless payment device.

The container assembly 10 is enabled for conducting electronic transactions by the connection of the chip 50 to the container via the carrier. For example, the chip 50 may be a radio frequency identification (RFID) tag, a near field communication (NFC) tag, or other chip configured to store and communicate information. The chip 50 may be a passive chip configured for short range communication in one embodiment, or may be an active or battery-assisted passive chip with a dedicated power source (not shown) that is also engaged and supported by the carrier 34 in another embodiment. It is understood that in another embodiment, the carrier 34 may engage and support a more complex device in place of a chip 50, such as a micro-computer device including a memory, a processor, a communications interface, and other components as described herein and shown in FIG. 11. In general, the chip 50 stores information that may include payment information configured to enable electronic payment, including at least a unique identifier or UID (e.g., a serial number, account number, etc.), and potentially additional information. The chip 50 is also capable of electronic communication with a reader or sensor 48 as shown in FIG. 9, including at least transmitting information to the reader 48. This transmitted information may include at least a UID, and may include additional information in some embodiments, such as timestamp information, general transaction metadata, and device type information. The reader 48 is in communication with one or more external computer devices 49, as also shown in FIG. 9, and can communicate the information received from the chip 50 to the external device(s) 49 for use in an electronic transaction. The chip 50 may include payment authorization parameters, which govern how payment is made and when payment is authorized. Such parameters may include one or more of: account(s) from which payment may be authorized, merchant(s)/vendor(s) to whom payment may be authorized, product(s) for which payment may be authorized, geographic areas in which payment may be authorized, transaction limits (e.g., monthly account limits), etc. Transactions that do not meet one or more payment authorization parameters may be denied. In one embodiment, the chip 50 may be used as a general credit or debit card.

The container assembly 10 is structured to permit interchanging of chips 50 with respect to a single container 12. In one embodiment, as shown in FIG. 2, chips 50 can be interchanged by removing a first carrier assembly 30 containing a first chip 50 from the container 12 and connecting a second carrier assembly 30' containing a second chip 50' to the container 12. It is understood that the carrier assemblies 30, 30' may have similar or identical connecting structures 32 to connect to the connecting structure 28 of the container 12. The carrier assemblies 30, 30' may include different visual indicia 31 configured for indicating a difference between the two chips 50, 50', such as by indicating a difference between the payment information on the chips 50, 50'. For example, the indicia 31 may indicate a financial institution or a vendor/merchant with which the chip 50, 50' is configured to enable transactions. In another embodiment, as shown in FIG. 8, chips 50 can be interchanged by removing or opening the cover 38, removing a first chip 50 from the receptacle 40, and inserting a second chip 50' into the receptacle 40, then closing or replacing the cover 38. The two chips 50, 50' may be different in one or more ways, such as having different electronic payment information; being usable for transactions with different parties; being usable with different communication technologies, hardware, or protocols (e.g., RFID or NFC); etc. In one embodiment, the two chips 50, 50' have at least one different payment authorization parameter, including at least one of authorizing payment from different accounts and authorizing payment to different merchants/vendors. For example, the user may be provided with a first chip 50 and/or carrier assembly 30 for use with a first vendor and a second chip 50' and/or carrier assembly 30' for use with a second vendor, and the user can connect the appropriate chip 50, 50' and/or carrier assembly 30, 30' to the container 12 depending on the vendor with which the user desires to conduct a transaction.

As also shown in FIG. 2, the carrier assemblies 30, 30' may be configured for attachment to more than one container 12, 12'. For example, two different containers 12, 12' may be provided with different container structures and similar or identical connecting structures 28 that enable connection of one or more carrier assemblies 30, 30' having complementary connecting structure 32 to either of the containers 12, 12'. The second container 12' in FIG. 2 has a different structure from the container 12 of FIG. 1, such as having no handle 26 and having a lid 27.

Figure 10:
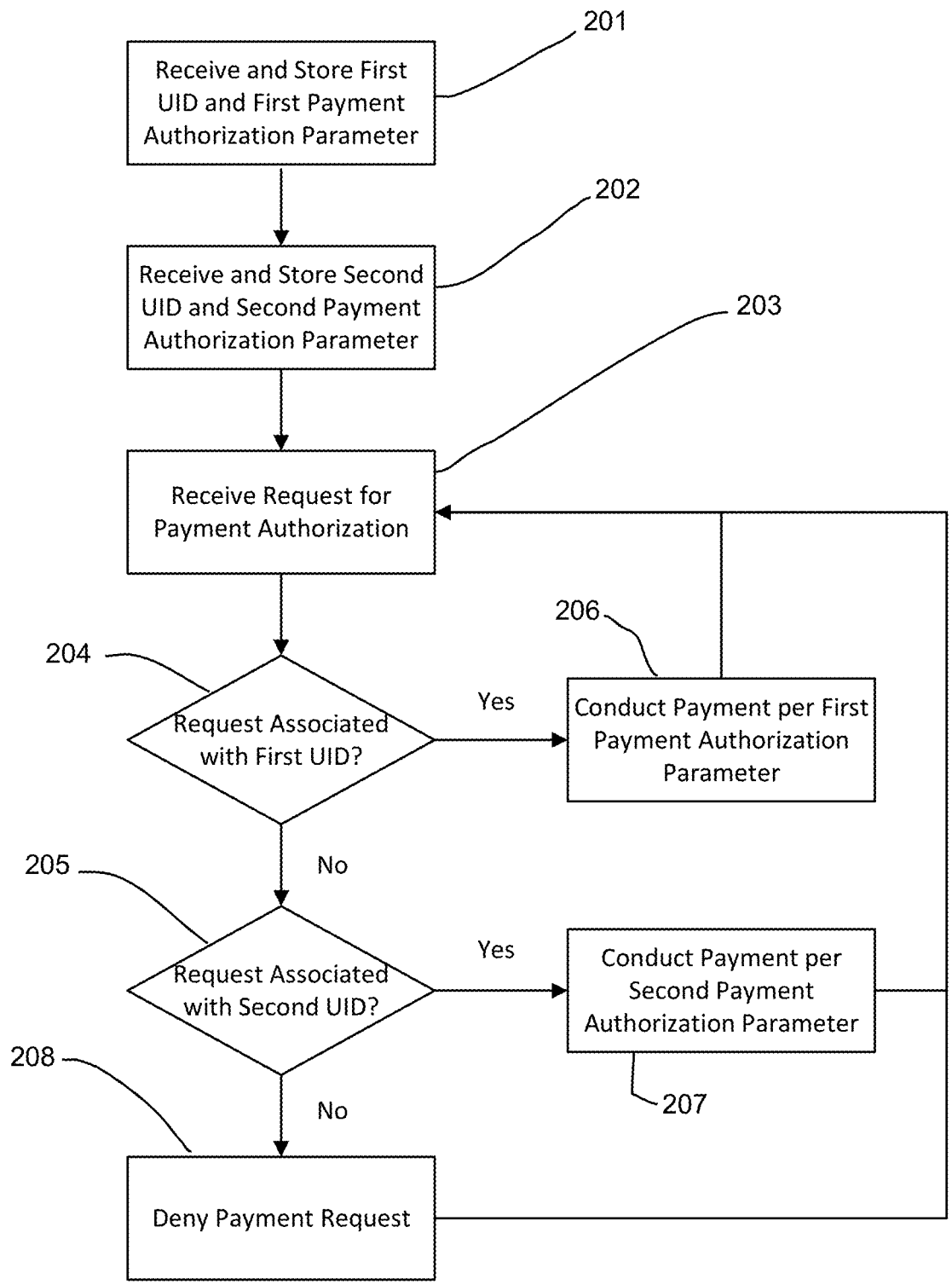
FIG. 10 is a flowchart depicting one embodiment of a computer-implemented method according to aspects of the disclosure.

FIG. 10 illustrates a method of conducting an electronic transaction that utilizes information received from the chip 50, including at least a UID, in an electronic payment transaction. The method of FIG. 10 may be a computer-implemented method, which may be implemented using one or more computer devices 101 as described herein and shown in FIG. 11. In the embodiment of FIG. 10, a user is associated with at least two chips 50 with two different UIDs that may be interchangeable with a container 12 as described herein. The chips 50 may have at least one different payment authorization parameter, such as at least one of authorizing payment from different accounts and/or authorizing payment to different merchants/vendors, as also described herein. The method as illustrated in FIG. 10 may be conducted by an intermediary between the user and the merchant/vendor receiving payment, such as a financial institution, or may be conducted by one or more vendors that are receiving payment themselves.

In the method of FIG. 10, the first UID and the second UID are received and stored at 201 and 202, such as by one or more memories 121 as described herein, which may also include receiving and/or storing any payment authorization parameters associated with each UID. Receiving and storing each UID may be performed as part of an activation procedure, which may be similar to procedures for opening an account and activating a payment card for use with such account. The chip 50 and the method of FIG. 10 may be used in connection with various accounts, such as credit accounts, debit accounts, stored value accounts, etc. In one embodiment, the chip 50 may be treated by a financial institution as an independent credit or debit card, having a unique identification number and expiration date and/or being uniquely linked to a designated account rather than linked to an existing credit or debit card/account. As such, the activation procedure may include receiving personal identifying information for the user (name, address, financial information, etc.), opening an account that is linked to the chip 50 or linking the chip 50 to an existing account, assigning a PIN number, setting payment terms and rules, etc. In one embodiment, the user may receive the chip 50 either alone for connection to the carrier assembly 30 by the user or by receiving the carrier assembly 30 with the chip 50 already connected thereto, and the user may then complete the activation procedure by contacting the provider (e.g., a financial institution) via telephone, email, internet, or other channel to confirm possession.

A request for payment authorization is received at 203, when the user attempts to use one of the chips 50 to conduct payment through an electronic transaction as described herein. For example, the request at 203 may be received from a merchant/vendor from which the user is attempting to purchase a product or service using the chip 50. The request is then evaluated at 204 and 205 to confirm whether the request is associated with the first UID (at 204) or the second UID (at 205). In general, a request associated with the first UID may be received if the first chip 50 is currently connected to the container 12, and a request associated with the second UID may be received if the second chip 50 is currently connected to the container 12. If the request is associated with the first UID, then the payment is conducted pursuant to the first payment authorization parameter associated with the first UID at 206. If the request is associated with the second UID, then the payment is conducted pursuant to the first payment authorization parameter associated with the second UID at 207. At either 206 or 207, the payment may be authorized or denied based on the first or second payment authorization parameters, and any further processing of the payment may also be based on the payment authorization parameters. For example, if the first payment authorization parameter and the second payment authorization parameter specify that payment can be made to different merchants, and the merchant associated with the second UID requests payment, the payment will be denied with respect to the first UID and authorized with respect to the second UID. If the request is not associated with a recognized UID, payment is denied at 208. After any of steps 206, 207, and 208, the method may end or may proceed further if another request for payment is received at 203.

It is understood that if only a single chip 50 with a single UID is used, the steps 202, 205, and 207 related to the second UID may be eliminated. It is also understood that if three or more chips 50 with three or more UIDs are used, the steps 202, 205, and 207 related to the second UID may be duplicated as necessary to address all UIDs for all chips that could potentially be used in the electronic transaction.

In one embodiment, a transaction using the chip 50 may utilize stored user preferences. For example, a user may have a standard or preferred product order with a particular vendor, and using the chip 50 to initiate a transaction (e.g., by transmitting payment information to the vendor) may automatically initiate an order of the preferred product without further user direction and simultaneously complete payment for the transaction. The user preferences may be stored by the relevant merchant or vendor in one embodiment, or may be stored on the chip 50 and transmitted along with the UID and potentially other information in another embodiment. A merchant or vendor may use a dedicated reader 48 for purchases of this type, permitting customers to place orders and complete payment simply by placing a container 12 carrying the chip 50 in sufficient proximity to the reader 48, without requiring employee attention. It is understood that this transaction technique may be used in connection with any electronic transactions described herein.

In other embodiments, the structural and functional features of the container assembly 10 may be used in connection with other methods, including other methods of conducting electronic transactions. For example, the chip 50 may include authorization information confirming that the user is authorized to receive products or services, e.g., that a user is enrolled in a beverage package plan through a vendor that entitles the user to receive beverages on demand from the vendor for a set time. In further embodiments, the methods described herein may be practiced in connection with one or more container assemblies that include a chip 50 permanently or non-removably connected to a container. For example, the method of FIG. 10 may be practiced with a first container assembly that includes a first chip 50 non-removably connected to a first container and a second container assembly that includes a second chip 50' non-removably connected to a second container, where the first and second chips 50, 50' have at least one payment authorization parameter that is different.

Figure 11:
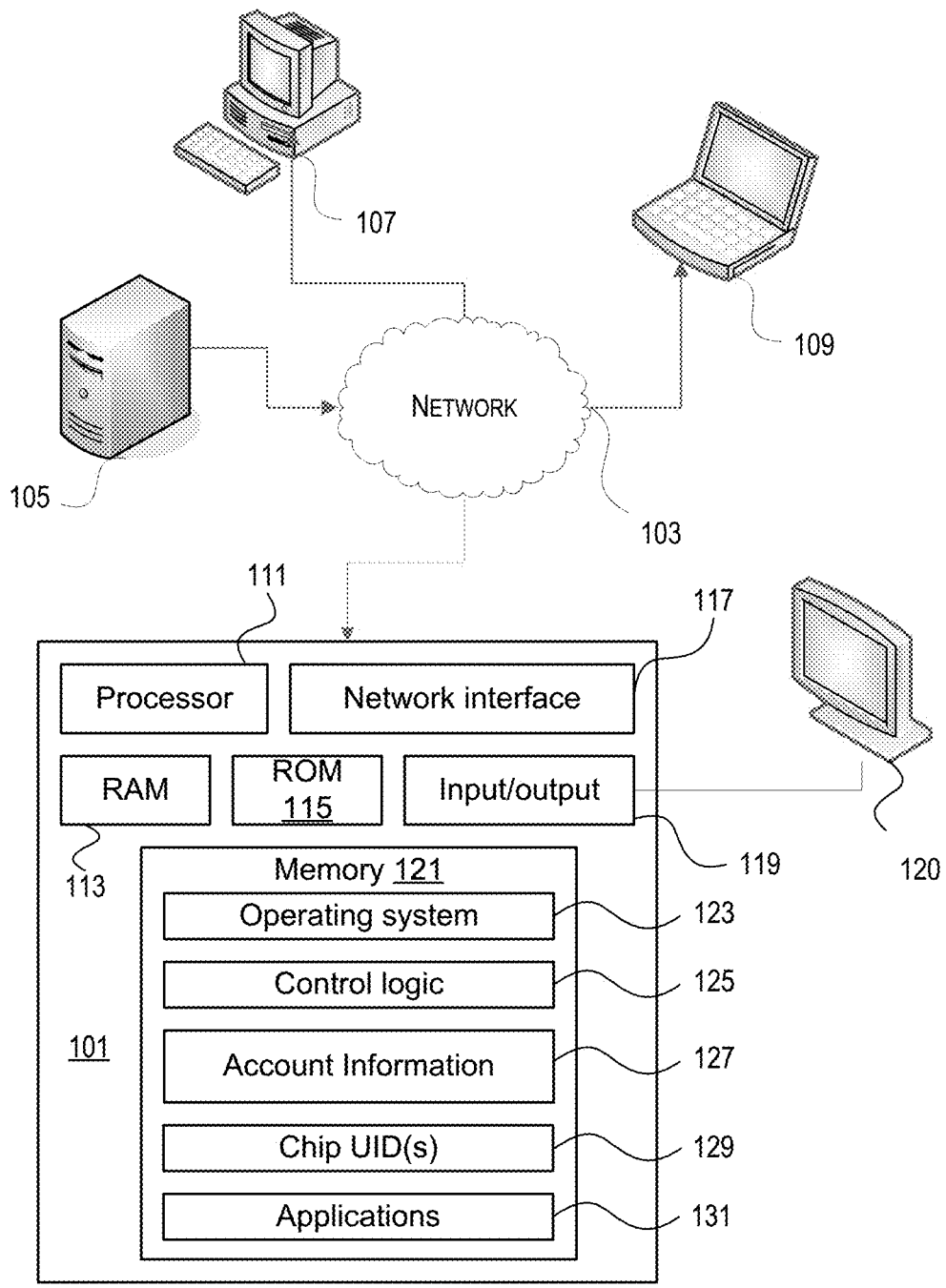
FIG. 11 depicts an example of a computing device that may be used in implementing one or more aspects of the disclosure in accordance with one or more illustrative aspects discussed herein.

The devices and methods described herein may be used in connection with a computing device or a system including one or more computing devices. The method of FIG. 10 may be practiced by one or more such computing devices. FIG. 11 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 11, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 11, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, user account information 127, information regarding chip unique identifiers 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a nontransitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Various embodiments of container assemblies and computer systems have been described herein, which include various components and features. In other embodiments, the container assembly and/or the computer system may be provided with any combination of such components and features. It is also understood that in other embodiments, the various devices, components, and features of the container assembly described herein may be constructed with similar structural and functional elements having different configurations, including different ornamental appearances.

The container assemblies, systems, and methods described herein provide advantages over existing technologies. For example, the connection structures for connecting the carrier to the container described herein provide connections that are easy to manipulate while also being secure and reliable. As another example, the use of easily interchangeable carrier assemblies and/or chips permits a user to use multiple different chips as desired for different financial transactions. As a further example, activating and using the chip as a unique payment method permits a financial institution to process transactions involving the chip without any change to the existing financial infrastructure of the institution. Still other benefits and advantages are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "side," and the like, as used herein, are intended for illustrative purposes only and do not limit the embodiments in any way. When used in description of a method or process, the term "providing" (or variations thereof) as used herein means generally making an article available for further actions, and does not imply that the entity "providing" the article manufactured, assembled, or otherwise produced the article. Nothing in this specification should be construed as requiring a specific three dimensional orientation of structures in order to fall within the scope of this invention, unless explicitly specified by the claims. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A system comprising:
a first carrier comprising a first base configured to rest on a first horizontal supporting surface, a first receptacle connected to the first base, and a first engagement structure configured for releasable connection to a first beverage container, wherein the first engagement structure comprises a first engagement member connected to the first base and releasably connected to a first connecting structure of the first beverage container to connect the first beverage container to the first base, such that the first base is configured to support the first beverage container on the first horizontal supporting surface;
a second carrier comprising a second base configured to rest on a second horizontal supporting surface, a second receptacle connected to the second base, and a second engagement structure configured for releasable connection to the first connection structure of the first beverage container, wherein the second engagement structure comprises a second engagement member connected to the second base and releasably connected to the first beverage container to connect the first beverage container to the second base, such that the second base is configured to support the first beverage container on the second horizontal supporting surface;
a first chip engaged with the first receptacle such that the first chip is carried by the first carrier, the first chip storing first electronic payment information, wherein the first chip is configured for transmitting the first electronic payment information to an external computer for authorizing payment; and
a second chip engaged with the second receptacle such that the second chip is carried by the second carrier, the second chip storing second electronic payment information, wherein the second chip is configured for transmitting the second electronic payment information to the external computer for authorizing payment,
wherein the first carrier and the second carrier are interchangeable with each other for connection to the first beverage container, wherein the first carrier and the second carrier are interchangeable with each other for connection to a second beverage container which has a different structure from the first beverage container, the second beverage container having a second connection structure, and wherein the first engagement structure and the second engagement structure are configured for releasable connection to the second connecting structure of the second beverage container such that the first carrier and the second carrier are interchangeable with each other for connection to the second beverage container.

2. The system of claim 1, wherein the first chip comprises at least one of a radio-frequency identification tag or a near-field communication chip.

3. The system of claim 1, wherein the first engagement member is configured for releasably engaging a complementary engagement member on the first beverage container to connect the first carrier to the first beverage container, and wherein the first engagement member is configured for releasably engaging a complementary engagement member on the second beverage container to connect the first carrier to the second beverage container.

4. The system of claim 3, wherein the first engagement member is a threaded member configured to engage the complementary engagement member on the first beverage container by a threading connection, and wherein the first engagement member is a threaded member configured to engage the complementary engagement member on the second beverage container by a threading connection.

5. The system of claim 3, wherein the first engagement member is a tab configured to engage the complementary engagement member.

6. The system of claim 3, wherein the first engagement member is a slot configured to receive the complementary engagement member.

7. The system of claim 3, wherein the first engagement member is configured to engage the complementary engagement member by rotation between a locked position, where the first engagement member is configured to engage the complementary engagement member to connect the first carrier to the first beverage container, and an unlocked position, where the first engagement member is configured to disengage from the complementary engagement member to permit removal of the first carrier from the first beverage container.

8. The system of claim 1, wherein the first carrier comprises a cover that is moveable to open and close the first receptacle, and wherein the first chip is removable from and insertable into the first receptacle when the cover is moved such that the first receptacle is open.

9. The system of claim 1, wherein the first chip is non-removably engaged with the first receptacle.

10. The system of claim 1, wherein the first base is configured to support the first beverage container on the first horizontal supporting surface such that no portion of the first beverage container contacts the first horizontal supporting surface.

11. The system of claim 1, wherein the first electronic payment information comprises a first unique identifier associated with the first chip, and the second electronic payment information comprises a second unique identifier associated with the second chip.

12. The system of claim 1, wherein the first carrier and the second carrier include visible information indicating a financial institution or vendor, wherein the visible information indicated by the first carrier is different from the visible information indicated by the second carrier.

13. The system of claim 1, wherein the first chip comprises a radio-frequency identification tag and the second chip comprises a near-field communication chip.

14. A system comprising:
a first beverage container configured for containing a beverage, the first beverage container having a connecting structure;
a first attachment comprising:
a first carrier having a first engagement structure configured for releasable connection to the connecting structure of the first beverage container to releasably connect the first beverage container to the first attachment; and
a first chip engaged with the first carrier such that the first chip is carried by the first carrier, the first chip storing first electronic payment information, wherein the first chip is configured for transmitting the first electronic payment information to an external computer for authorizing payment;
a second attachment comprising:
a second carrier having a second engagement structure configured for releasable connection to the connecting structure of the first beverage container to releasably connect the first beverage container to the second attachment; and
a second chip engaged with the second carrier such that the second chip is carried by the second carrier, the second chip storing second electronic payment information, wherein the second chip is configured for transmitting the second electronic payment information to the external computer for authorizing payment; and
a second beverage container having a different structure from the first beverage container, the second beverage container having a second connecting structure,
wherein the first attachment and the second attachment are interchangeable with each other for connection to the first beverage container,
wherein the first engagement structure and the second engagement structure are configured for releasable connection to the second connecting structure of the second beverage container such that the first attachment and the second attachment are interchangeable with each other for connection to the second beverage container, and
wherein the first electronic payment information is different from the second electronic payment information.

15. The system of claim 14, wherein the first electronic payment information comprises a first unique identifier associated with the first chip, and the second electronic payment information comprises a second unique identifier associated with the second chip.

16. The system of claim 14, wherein the first engagement structure and the second engagement structure are both configured for releasable connection to the connecting structure of the first beverage container by rotation with respect to the first beverage container.

17. The system of claim 14, wherein the first engagement structure and the second engagement structure are both configured for releasable connection to the connecting structure of the first beverage container by a flexible tab and an engagement surface engaged by the flexible tab, such that the connecting structure of the first beverage container comprises one of the flexible tab and the engagement surface, and the first and second engagement structures each comprise the other of the flexible tab and the engagement surface.

18. The system of claim 14, wherein the first carrier and the second carrier include visible indicia indicating a difference between the first electronic payment information and the second electronic payment information.

19. A computer-implemented method comprising:
- storing, at a computer system, a first unique identifier identifying a first chip associated with a first payment authorization parameter, wherein the first chip is configured for engaging a beverage container to physically connect the first chip to the beverage container;
- storing, at the computer system, a second unique identifier identifying a second chip associated with a second payment authorization parameter that is different from the first payment authorization parameter, wherein the second chip is configured for engaging the beverage container to physically connect the second chip to the beverage container, such that the first chip and the second chip are interchangeably connectable to the beverage container;
- receiving, at the computer system, a first request for payment authorization associated with the first unique identifier, when the first chip is physically connected to the beverage container;
- authorizing, by the computer system, payment according to the first payment authorization parameter in response to the first request;
- receiving, at the computer system, a second request for payment authorization associated with the second unique identifier, when the second chip is physically connected to the beverage container; and
- authorizing, by the computer system, payment according to the second payment authorization parameter in response to the second request,
- wherein the first request for payment authorization is received from a first merchant authorized for payment according to the first payment authorization parameter and not authorized for payment according to the second payment authorization parameter, and the second request for payment authorization is received from a second merchant authorized for payment according to the second payment authorization parameter and not authorized for payment according to the first payment authorization parameter.

20. The method of claim 19, wherein the second payment authorization parameter is different from the first payment authorization parameter by at least one of authorizing payment from different accounts and authorizing payment to different merchants.

* * * * *